United States Patent [19]

Rispeter et al.

[11] Patent Number: 4,613,184

[45] Date of Patent: Sep. 23, 1986

[54] BODY STRUCTURE FOR MOTOR VEHICLES, ESPECIALLY PASSENGER MOTOR VEHICLES

[75] Inventors: Siegfried Rispeter, Besigheim; Diethelm Schneider, Leonberg, both of Fed. Rep. of Germany

[73] Assignee: Dr. Ing. h.c.F. Porsche A.G., Fed. Rep. of Germany

[21] Appl. No.: 500,814

[22] Filed: Jun. 3, 1983

[30] Foreign Application Priority Data

Jun. 22, 1982 [DE] Fed. Rep. of Germany ....... 3223156

[51] Int. Cl.⁴ .............................................. B60R 21/00
[52] U.S. Cl. .................................... 296/187; 296/194; 296/203; 280/781; 280/785
[58] Field of Search ........ 296/185, 187, 188, 193–194, 296/203–204; 280/781, 784, 797, 785

[56] References Cited

U.S. PATENT DOCUMENTS

| | | | |
|---|---|---|---|
| 2,669,462 | 2/1954 | Toncray et al. | 280/785 |
| 3,131,963 | 5/1964 | Schilberg | 296/204 |
| 4,030,772 | 6/1977 | Jacob et al. | 296/204 X |
| 4,189,177 | 2/1980 | Schwuchow et al. | 280/781 X |
| 4,428,599 | 1/1984 | Jahnle | 296/185 X |
| 4,440,435 | 4/1984 | Norlin | 296/194 X |

*Primary Examiner*—Robert B. Reeves
*Assistant Examiner*—Russell D. Stormer
*Attorney, Agent, or Firm*—Craig & Burns

[57] ABSTRACT

A body structure for a passenger motor vehicle includes an end unit provided with a support system formed by transverse and longitudinal supports; the support system is retained at a boundary wall of a passenger cell by a mounting arrangement including detachable elements. In order to achieve a good force translation from the end unit to the passenger cell and in order to be able to carry out a rapid and cost-favorable repair of the end unit in case of an accidental impact, several mounting devices for an upper longitudinal support and a lower longitudinal support of the support system are provided at the boundary wall, whereby the longitudinal supports of the support system are received by further supports so as to generally form a continuation of the support structure of the passenger cell.

22 Claims, 7 Drawing Figures

BODY STRUCTURE FOR MOTOR VEHICLES, ESPECIALLY PASSENGER MOTOR VEHICLES

The present invention relates to a body structure for motor vehicles, especially passenger motor vehicles, whose end area includes a support system formed of transverse and longitudinal supports, which is retained at a boundary wall of a vehicle passenger cell by means of a mounting arrangement including detachable elements.

In a known motor vehicle of the aforementioned type (German Pat. No. 891,505), the support system is retained by a mounting arrangement which is provided at a wall delimiting the passenger space. This prior art construction entails the disadvantage that an unfavorable force-introduction takes place from the support system of the end area into the vehicle passenger cell since the mounting arrangement is provided merely at the non-supported vehicle cross wall. In case of an accident impact acting in the vehicle longitudinal direction, not only the detachable end unit is damaged, but also structural parts of the vehicle passenger cell, whence high costs will result for the repair.

In another known construction (German Auslegeschrift No. 17 80 029), devices are provided on both sides of a center longitudinal plane for the mounting of an end unit. Though these mounting devices are connected to a wall delimiting the passenger cell, this is done without taking into consideration the layout of the support structure in the passenger cell.

It is the object of the present invention to provide a body structure for a motor vehicle, whose end unit is connected with the passenger cell by way of detachable elements in such a manner that a favorable force-translation takes place from the end unit into the support structure of the passenger cell. Additionally, the end unit damaged by an accident impact is to be replaceable rapidly and cost-favorably.

The underlying problems are solved according to the present invention in that several mounting arrangements for an upper longitudinal support and a lower longitudinal support of the support system are arranged at the boundary wall, whereby the longitundinal supports are connected to supports of a support structure of the passenger cell so that the longitudinal supports of the end unit are like extensions of the support structure of the passenger cell.

The advantages primarily achieved with the present invention reside in that a favorable force-translation from the end unit by way of the mounting arrangements into the support structure of the passenger cell is achieved by the direct attachment of the mounting arrangements to supports of the passenger cell. A connection between the end unit and the passenger cell which will reliably withstand the loads and stresses occurring during the driving operation, is achieved in that the longitudinal supports of the support system are additionally connected by the mounting arrangements to the passenger cell by jointed flange connections. Moreover, at least two positionally offset detachable elements are provided between each longitudinal support and its corresponding mounting device. Therebeyond, a transmission of vibrations from the end unit into the passenger cell is substantially reduced by the indirect attachment of the support wall to the boundary wall. Furthermore, in case of a collision, a rapid and cost-favorable exchange of the end unit is assured. After the removal of the detachable fastening means, the flanged connections of the end unit are bored open, as a result of which a simple separation of the end area is achieved.

These and other objects, features and advantages of the present invention will become more apparent from the following description when taken in connection with the accompanying drawing which shows, for purposes of illustration only, one embodiment in accordance with the present invention, and wherein.

Figure 1:
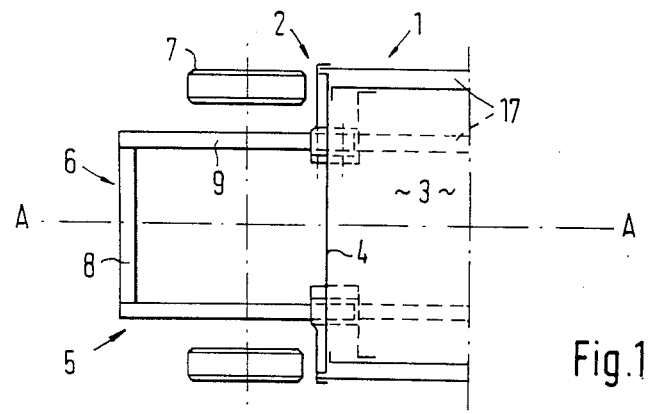
FIG. 1 is a somewhat schematic plan view of the front part of a motor vehicle in accordance with the present invention.

Referring now to the drawing wherein like reference numerals are used throughout the various views to designate like parts, the passenger motor vehicle generally designated by reference numeral 1 which is illustrated in FIG. 1, includes a body generally designated by reference numeral 2 with a passenger cell 3 which is connected with an end unit generally designated by reference numeral 5 generally in the area of a boundary wall 4. The boundary wall 4 is formed according to FIG. 2, by two stamped-out sheet metal parts attached to one another which are welded together along parallel extending flanges.

In the illustrated embodiment, the end unit 5 is formed as a vehicle front section. However, the possibility also exists to utilize this principle of construction for a rear section.

Figure 2:
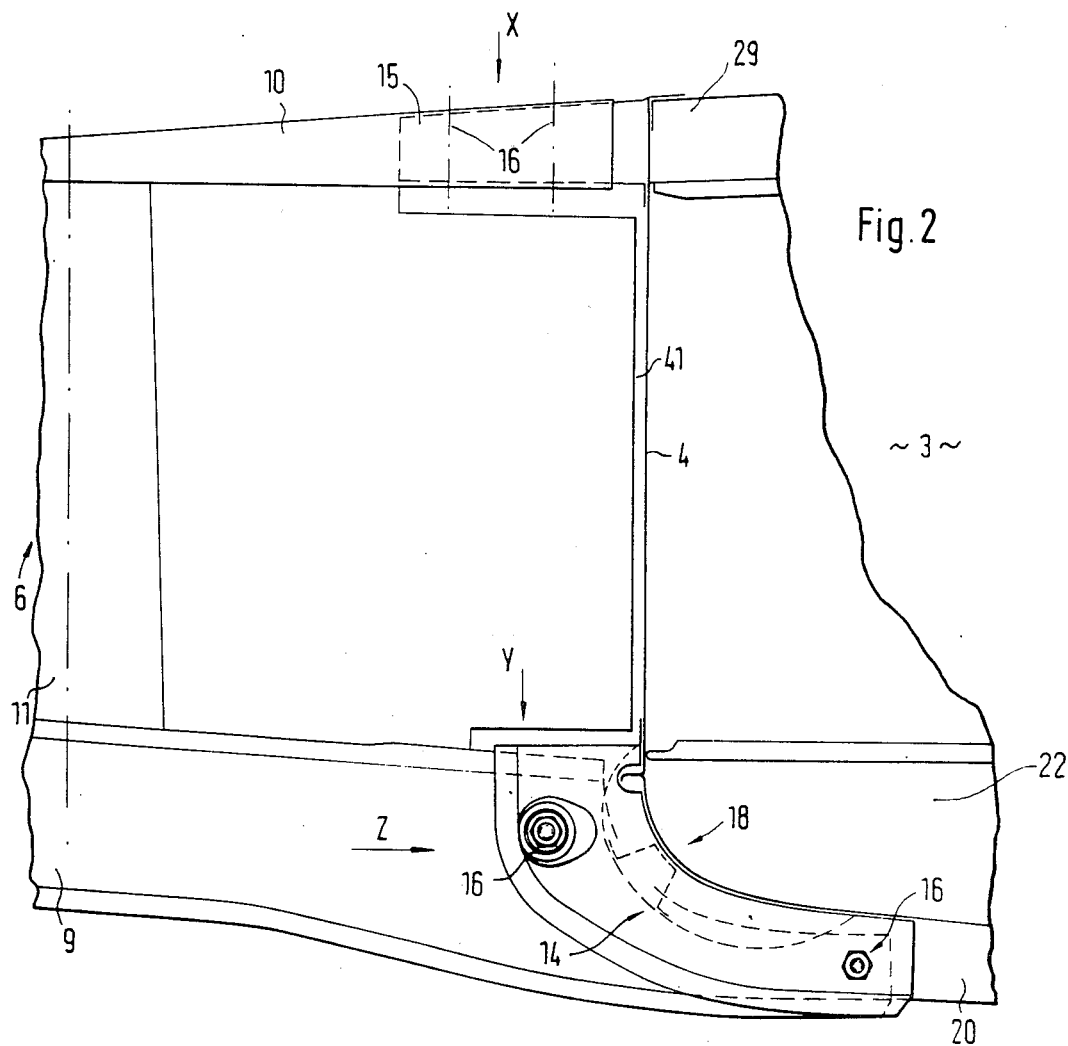
FIG. 2 is a partial side elevational view of the front part of the motor vehicle shown in FIG. 1, on an enlarged scale.

The end unit 5 includes a support system generally designated by reference numeral 6 on which, on the one hand, a bumper (not shown) and, on the other, wheels 7 are retained. The wheels 7 are connected with the support system 6 by means of wheel guide members not illustrated in detail. The support system 6 includes transverse supports 8 which are connected with lower longitudinal supports 9 and upper longitudinal supports 10 extending on both sides of a center longitudinal plane A—A. A support wall 11 extends between each lower longitudinal support 9 and the higher upper longitudinal support 10 (FIG. 2).

Figure 5:
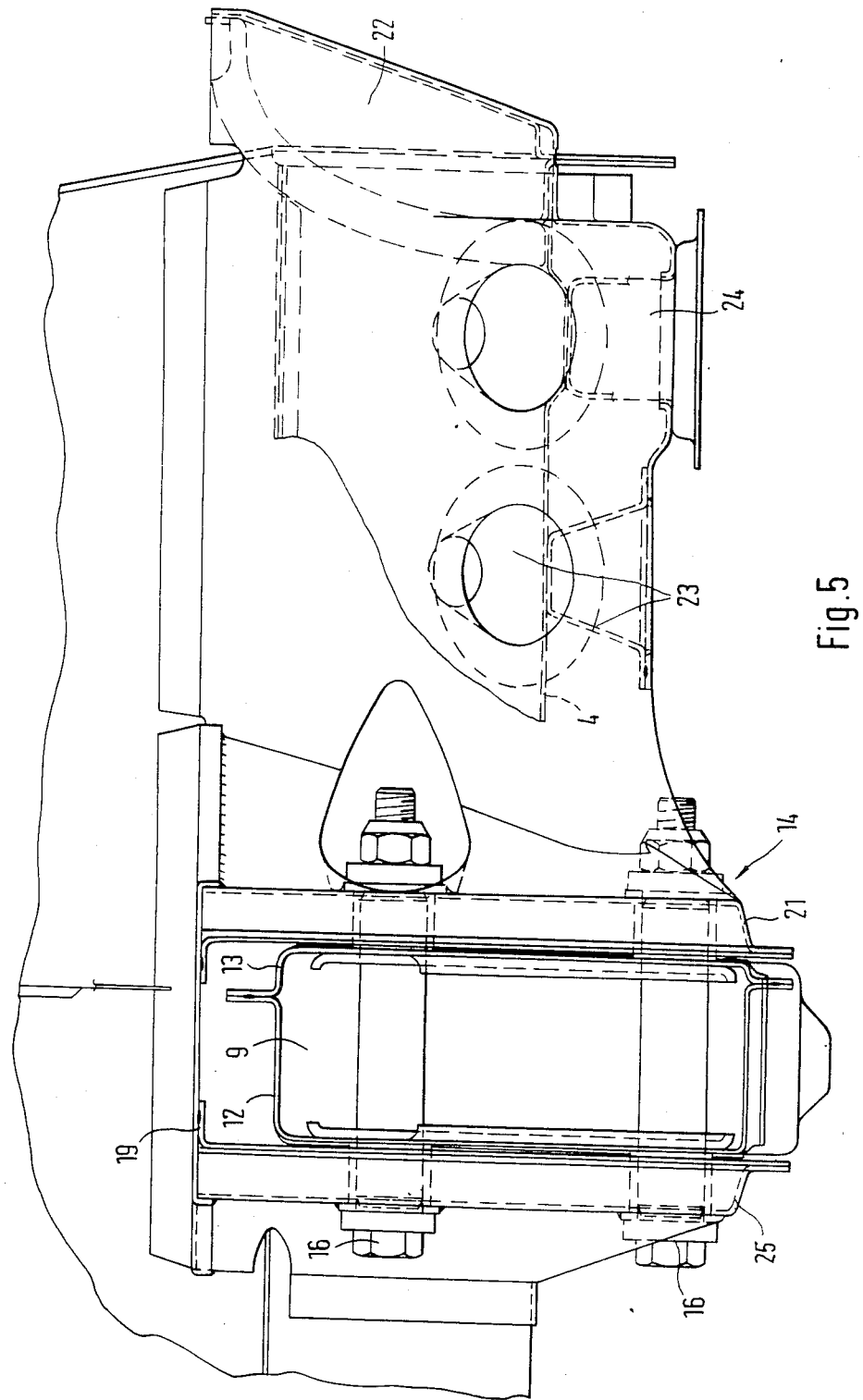
FIG. 5 is a partial elevational view taken in the direction of arrow Z of FIG. 2.

The lower longitudinal support 9 includes two half-shells 12 and 13 which are assembled into a box-shaped hollow support and are connected with each other by welding (FIG. 5). The cross section of the lower longitudinal support 9 is preferably rectangular whereby the longer sides extend in the vertical direction. The upper longitudinal support 10 is also constructed as box-shaped hollow support.

Figure 6:
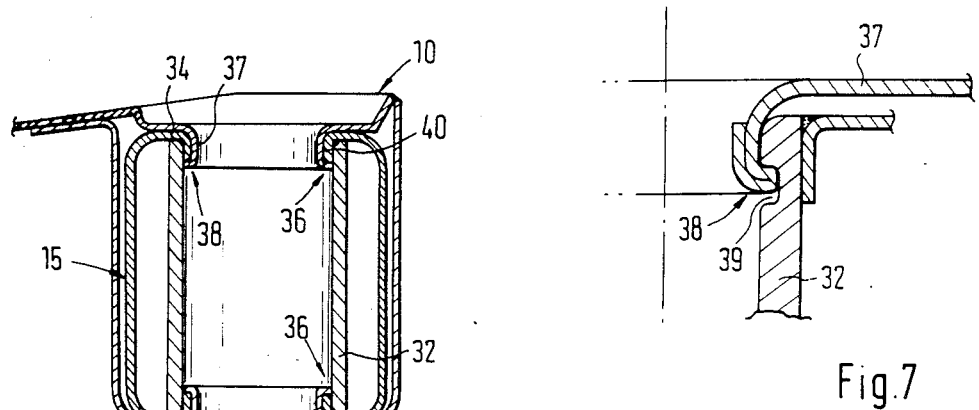
FIG. 6 is a cross-sectional view, on an enlarged scale, taken along line VI—VI of FIG. 3.

In order to be able to carry out in case of a collision a rapid and cost-favorable repair of the end unit 5, which is constructed in an energy-absorbing manner, the longitudinal supports 9 and 10 of the support system 6 are detachably connected with the passenger cell 3 which is constructed form-rigid. For this purpose, mounting devices 14 and 15 which are formed so as to be hollow and generally support-like, are provided locally for the longitudinal supports 9 and 10 on the side of the boundary wall 4 opposite the passenger cell 3 (FIG. 2). The mounting devices 14 and 15 are preferably connected by welding with the boundary wall 4. The longitudinal supports 9 and 10 cooperate with the corresponding mounting devices 14 and 15 forming plug-in-like connections. In the illustrated embodiment, the lower longitudinal support 9 is inserted into a mounting device 14 (FIG. 4); the upper longitudinal support 10 surrounds the upper mounting device 15 (FIGS. 2 and 6). The longitudinal supports 9 extending into the mounting devices 14 are closed off at the end face for rigidity reasons.

For fixing each longitudinal support at the corresponding mounting device, at least two detachable elements 16 are provided which are arranged positionally offset to one another. These elements 16 can be arranged offset to one another in the vehicle longitudinal direction, in the vehicle transverse direction and in height. Preferably, clamping bolts or the like are used as detachable elements 16.

A good force-translation from the support system 6 by way of the mounting devices 14 and 15 into the passenger cell 3 is achieved in that each longitudinal support 9, 10 of the end unit 5 is attached directly to a support of a support structure 17 (FIGS. 1 and 4) of the passenger cell 3.

The lower mounting device 14 is connected to wall sections of the boundary wall 4 and extends both in the vertical and in the vehicle longitudinal direction, as a result of which a rigid connection is achieved between the mounting device 14 and the boundary wall 4 (FIG. 2). The transition area 18 is constructed arcuately shaped in the illustrated embodiment; however, the possibility also exists to construct the transition area 18 angularly shaped.

The lower mounting device 14 includes a longitudinally directed support member 19 constructed so as to have a hollow profile in cross section, which is open in the direction toward the front end and downwardly (FIG. 5). The rear end of the support member 9 is connected to a longitudinal support 20 of the passenger cell 3 (FIG. 4).

Figure 4:
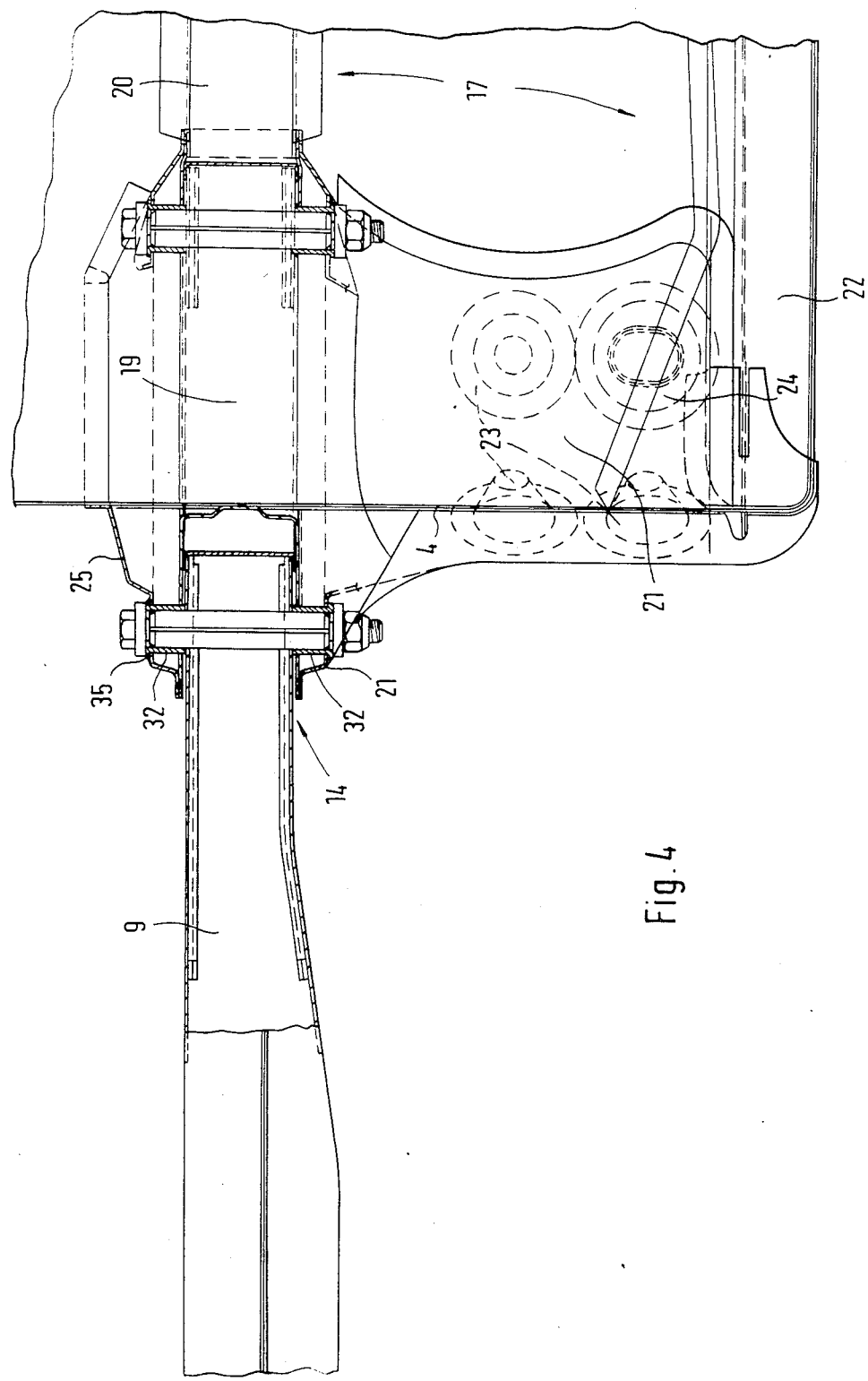
FIG. 4 is a partial plan view taken in the direction of arrow Y of FIG. 2.

An advantageous force-translation from the lower longitudinal support 9 into the support structure 17 of the passenger cell 3 is achieved in that the lower mounting device 14 is connected by way of a reinforcing portion 21 (FIG. 4) with a longitudinal threshold support member 22 extending at a distance to the mounting device 14 (FIG. 4). The reinforcing portion 21 forms together with the boundary wall 4, a box-shaped transverse support which is connected laterally, on the one hand, to the support member 19 and, on the other, to the longitudinal threshold support member 22.

Reinforcements 23 haaving generally hat-like-profile are provided locally between the arcuately shaped configuration of the boundary wall 4 and the reinforcing part 21. These reinforcements 23 are supported at the boundary wall 4 and at the reinforcing part 21 by way of flanges (FIGS. 4 and 5). Moreover, a pot-shaped element 24 is arranged between the boundary wall 4 and the reinforcing part 21 which serves as a vehicle-lifter mounting means. A further box-shaped support is provided at the side of the support member 19 opposite the reinforcing part 21 for reinforcing the mounting device 14; the further box-shaped support is formed by a closure plate 25 secured at the support member 19 and at the boundary wall 4.

Figure 3:
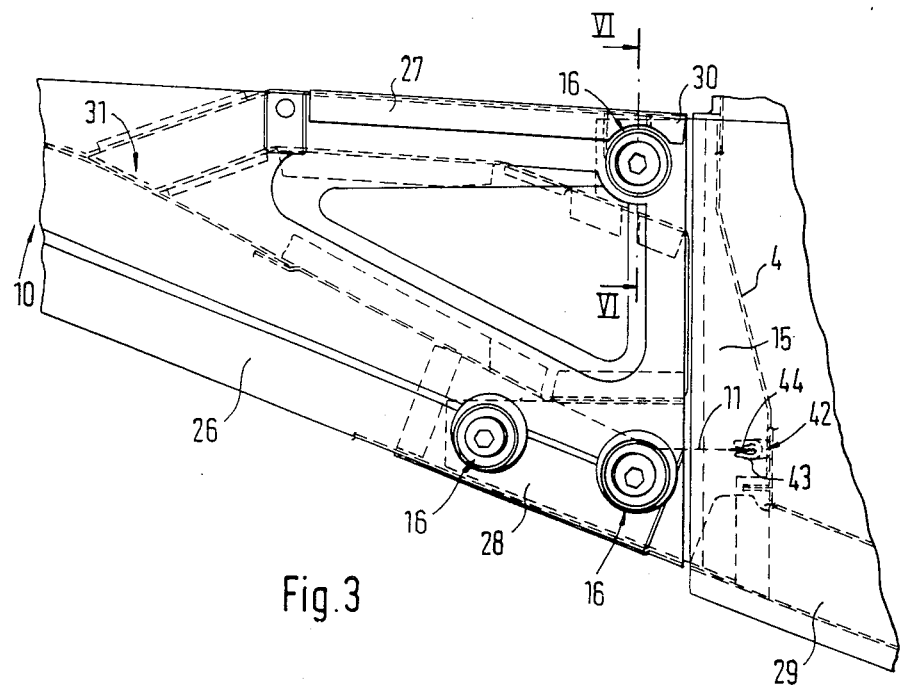
FIG. 3 is a partial plan view taken in the direction of arrow X of FIG. 2.

The upper longitudinal support 10 includes support sections 26 and 27 which are arranged fork-like as viewed in the vehicle longitudinal direction within the area of its mounting device 15 (FIG. 3). One support section 26 of the longitudinal support 10 thereby extends obliquely outwardly and is connected by way to a support arm 28 of the mounting device 15 with a frame support 29 of the passenger cell 3 disposed therebehind. The other support section 27 extends approximately parallelly to the center longitudinal plane A—A, whereby its one end is connected with a further support arm of the mounting device 15. The other end of the support section 27 terminates at 31 laterally in the support section 26. A favorable force-distribution is achieved by the triangularly shaped support connection formed by the upper longitudinal support 10 and the upper mounting device 15.

Within the area of the detachable elements 16, bearing sleeves 32 are arranged at the mounting devices 14 and 15 (FIGS. 4 and 6). In the upper mounting device 15, each fastening point includes a bearing sleeve 32. This bearing sleeve 32 extends between oppositely disposed walls 33 and 34 of the mounting device 15. The bearing sleeve 32 is connected with the walls 33 and 34 either by welding or by flanging (FIG. 6).

In contrast thereto, at the lower mounting devices 14, two coaxial bearing sleeves 32 arranged at a distance to one another are provided at each fastening point, which extend on both sides of the support member 19 (FIG. 4). The bearing sleeves 32 are secured to lateral walls of the support member 19 and to the reinforcing part 21, respectively, at the closure plate 25. The bearing sleeves 32 are provided preferably with a collar 35 at the lower mounting devices 14 within the support area of the detachable element 16 (FIG. 4).

Figure 7:
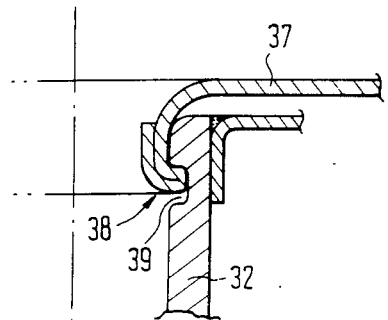
FIG. 7 is a partial cross-sectional view illustrating a detail of a modified embodiment of the flanged connection of FIG. 6.

An additional improvement of the connection between end unit 5 and passenger cell 3 is achieved in that the longitudinal supports 9 and 10 are connected with the mounting devices 14 and 15 within the area of the detachable elements 16 additionally by way of a jointed flange connection generally designated by reference numeral 36 (FIG. 6). The flanged connection 36 is formed by bent wall sections 37 of the longitudinal supports 9 and 10 which are supported at shoulders or collars 38 provided proximate the end faces of the bearing sleeves 32 and thus effect a form-locking connection. The shoulders 38 are formed according to FIG. 7 by locally arranged notches 39. In FIG. 6, the shoulders are represented by bent-over flanges 40 of the mounting devices 15.

In order to avoid a transmission of the vibrations from the end unit 5 into the passenger cell 3, the support system 6 of the end unit is connected directly with the boundary wall 4 only at the lower longitudinal supports 9 and at the upper longitudinal supports 10. In contrast thereto, within the area disposed therebetween, the support wall 11 extends at a distance to the boundary wall 4. A sealing body 42 which is under prestress is inserted into the gap 41 resulting therefrom. The sealing body 42 is retained at the edge 44 of the support wall 11 by means of a clamping profile 43 (FIGS. 2 and 3).

The assembly of end unit 5 and passenger cell 3 takes place in such a manner that at first the two upper longitudinal supports 10 are pushed over the upper mounting devices 15, whereby simultaneously an insertion of the lower longitudinal supports 9 into the mounting devices 14 takes place. Thereafter, the walls of the longitudinal supports 9 and 10 are provided with bores within the area of the detachable elements 16, which have a small diameter and serve for the insertion of flanging tools. After completion of the flanged connections 36, the detachable elements 16 are finally inserted into the bearing sleeves 32 and secured.

In case of a repair of the end unit 5 conditioned by an accident impact, at first the detachable elements 16 are removed. Thereupon, the flanged connections 36 are bored open, as a result of which the end unit 5 is separated from the passenger cell 3 in a simple manner. The mounting devices 14 and 15 of the passenger cell 3 and the bearing sleeves 32 are not damaged thereby. Subsequently, the insertion of a new end unit 5 takes place in the sequence described above.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A body structure for a motor vehicle comprising an end unit having a support structure formed of transverse and longitudinal support means and a passenger cell having a support structure including longitudinally extending supports, a boundary wall separating the passenger cell from the end unit, upper and lower hollow mounting means associated with said boundary wall for axial aligning upper and lower longitudinal support means of the end unit with respective upper and lower longitudinally extending supports of the passenger cell, said upper longitudinal support means including a bifurcated portion and said upper mounting means including means for detachably securing the respectively aligned upper longitudinal support means and upper longitudinally extending support, said lower mounting means including a reinforcing part and means for detachably securing the respectively aligned lower longitudinal support means and lower longitudinally extending support, whereby said end unit is mounted by said mounting means in a manner so that the upper and lower longitudinal support means generally form a continuation of the respective upper and lower longitudinally extending supports of the passenger cell.

2. A body structure according to claim 1, wherein the means for detachably securing includes at least two detachable elements which are arranged positionally offset relative to one another.

3. A body structure according to claim 1, wherein a support wall means extends between the upper and lower longitudinal support means.

4. A body structure according to claim 1, wherein the lower mounting means is connected with a longitudinal threshold support means extending at a distance thereto by the reinforcing part.

5. A body structure according to claim 4, wherein the lower mounting means is connected to wall sections of the boundary wall means which extend generally in upright and vehicle longitudinal directions.

6. A body structure according to claim 5, wherein the lower mounting means has a box-shaped cross section.

7. A body structure according to claim 6, wherein the boundary wall means has an arcuately shaped configuration in the lower area and reinforcement means are provided between the arcuately shaped configuration and the reinforcing portion.

8. A body structure according to claim 7, wherein the bifurcated portion of the upper longitudinal support means includes two support sections arranged at a distance within the area of the respective mounting means.

9. A body structure according to claim 8, wherein at least one support section of the upper longitudinal support means is aligned with and connected to an upper longitudinally extending support of the vehicle passenger cell.

10. A body structure according to claim 9, wherein the mounting means include bearing sleeve means adjacent the means for detachably securing.

11. A body structure according to claim 10, wherein the longitudinal support means are connected with respective mounting means adjacent the means for detachably securing by flanged connections.

12. A body structure according to claim 11, wherein a gap is provided between the support wall means and the boundary wall means, into which is inserted sealing body means.

13. A body structure according to claim 12, wherein the means for detachably securing includes at least two detachable elements which are arranged positionally offset relative to one another.

14. A body structure according to claim 11, wherein a support wall means extends between the upper and lower longitudinal support means.

15. A body structure according to claim 1, wherein the lower mounting means has a box-shaped cross section.

16. A body structure according to claim 4, wherein the boundary wall means has an arcuately shaped configuration in the lower area and reinforcement means are provided between the arcuately shaped configuration and the reinforcing portion.

17. A body structure according to claim 1, wherein the bifurcated portion of the upper longitudinal support means includes two support sections arranged at a distance adjacent the respective mounting means.

18. A body structure according to claim 17, wherein at least one portion of the bifurcated portion of the upper longitudinal support means is aligned with and connected to a respective upper longitudinally extending support of the vehicle passenger cell.

19. A body structure according to claim 1, wherein each of the mounting means include bearing sleeve means adjacent the means for detachably securing.

20. A body structure according to claim 1, wherein the longitudinal support means are connected with the mounting means adjacent the means for detachably securing by flanged connections.

21. A body structure according to claim 3, wherein a gap is provided between the support wall means and the boundary well means, into which is inserted sealing body means.

22. A body structure for a motor vehicle with an end unit having a support structure formed of transverse and longitudinal support means, the end unit being retained relative to a boundary wall means of a passenger cell of the vehicle by mounting means including detachable elements, said boundary wall means separating the passenger cell and the end unit, said mounting means including several mounting means for mounting upper longitudinal support means and lower longitudinal support means of said end unit support structure proximate the boundary wall means, said upper and lower longitudinal support means being generally axially aligned with longitudinally extending supports of said passenger cell and mounted by said mounting means in a manner so as to generally form a continuation of the longitudinally extending supports of the support structure of the passenger cell, a lower mounting means of said several mounting means being connected with a threshold longitudinal support means of the passenger cell extending at a distance thereto by way of a reinforcing portion, a support section of said upper longitudinal support means being connected to a respective upper longitudinally extending support of the vehicle passenger cell, and the longitudinal support means being connected with respective mounting means within the area of the detachable elements by flanged connections.

* * * * *